United States Patent
Onuma et al.

(10) Patent No.: US 8,348,339 B2
(45) Date of Patent: Jan. 8, 2013

(54) SEAT THAT DETECTS PELVIS AND CHEST DISPLACEMENT

(75) Inventors: Masahiko Onuma, Aichi-gun (JP); Terumitsu Ozawa, Nagoya (JP)

(73) Assignees: Toyota Jidosha Kabushiki Kaisha, Toyota-shi (JP); Toyota Boshoku Kabushiki Kaisha, Kariya-shi (JP)

( * ) Notice: Subject to any disclaimer, the term of this patent is extended or adjusted under 35 U.S.C. 154(b) by 286 days.

(21) Appl. No.: 12/812,389

(22) PCT Filed: Jan. 14, 2009

(86) PCT No.: PCT/JP2009/050366
§ 371 (c)(1),
(2), (4) Date: Jul. 9, 2010

(87) PCT Pub. No.: WO2009/090954
PCT Pub. Date: Jul. 23, 2009

(65) Prior Publication Data
US 2010/0283299 A1  Nov. 11, 2010

(30) Foreign Application Priority Data
Jan. 15, 2008 (JP) ................................ 2008-005655

(51) Int. Cl.
*A47C 7/14* (2006.01)
*A47C 31/00* (2006.01)
*B60R 22/00* (2006.01)
(52) U.S. Cl. ...................... 297/284.3; 297/217.3; 701/49
(58) Field of Classification Search ................... 701/49; 297/284.1, 284.3, 284.11, 217.3
See application file for complete search history.

(56) References Cited

U.S. PATENT DOCUMENTS

| 4,676,550 | A | * | 6/1987 | Neve De Mevergnies ... 297/353 |
| 5,836,647 | A | * | 11/1998 | Turman ....................... 297/216.1 |
| 6,578,917 | B1 | * | 6/2003 | Aubert et al. .................. 297/317 |
| 6,640,653 | B1 | * | 11/2003 | Ishida ........................ 73/862.627 |
| 7,575,085 | B2 | * | 8/2009 | Kamizono et al. ............ 180/273 |
| 2005/0127728 | A1 | | 6/2005 | Sugiyama et al. | |

FOREIGN PATENT DOCUMENTS

| JP | 7 6835 | 2/1995 |
| JP | 2001 353039 | 12/2001 |
| JP | 2005 52433 | 3/2005 |
| JP | 2005 125846 | 5/2005 |
| JP | 2006 290099 | 10/2006 |

* cited by examiner

*Primary Examiner* — Milton Nelson, Jr.
(74) *Attorney, Agent, or Firm* — Oblon, Spivak, McClelland, Maier & Neustadt, L.L.P.

(57) ABSTRACT

A seat for reducing looseness of a seated posture in the entirety of the body. In connection with a load peak position of the pelvis of a seated occupant as detected by a pelvis displacement sensor disposed in the seat cushion of a seat, a control device compares an initial peak position and a peak position after displacement. At the same time, the control device detects a shoulder blade position from load distribution of the chest of the seated occupant, detected by a chest displacement detecting sensor disposed in the upper portion of a seat back, and compares an initial position detected in advance and an after-displacement position. Next, the control device moves the seating position of a seat cushion in a direction to eliminate dislocation between the initial peak position and the after-displacement peak position, and moves the upper portion of the seat back in a direction to eliminate dislocation between the initial position and the after-displacement position of the shoulder blade of the seated occupant.

14 Claims, 6 Drawing Sheets

SEAT THAT DETECTS PELVIS AND CHEST DISPLACEMENT

TECHNICAL FIELD

The present invention relates to a seat, and particularly relates to a seat equipped with a seat cushion and a seat back.

BACKGROUND ART

Heretofore, a seat has been known that is equipped with a seat cushion and a seat back and is capable of adjusting a seated posture of a seated person. For example, in the car seat recited in Patent Reference 1, a seating portion of the car seat includes a seating portion reinforcement frame that supports a suspension grid, and an oscillation unit that generates oscillatory movements in the seating portion. This produces an alternating upward massage effect at the lower side of the thighs and small movements of the lower portion of the spine, at the same time as moving the pelvis rearward to a correct position. Further, a seat recited in Patent Reference 2 is equipped with a lumbar support device that supports the lumbar region of a seat occupant, a pelvis support device that supports the pelvis region, a detection unit that detects turning of the pelvis, and a control unit, and maintains an optimum seated posture.

Patent Reference 1: Japanese Patent Application Laid-Open (JP-A) No. 2001-353039
Patent Reference 2: Japanese Utility Model Application Laid-Open (JP-U) No. H3-19344

DISCLOSURE OF INVENTION

Problem to be Solved by the Invention

However, with the above-described related art technologies, after sitting on the seat for a long period, a seated person may have a seated posture with great looseness in the entirety of the body. That is, the pelvis region may be displaced and the upper body supported by the seat back may also be displaced.

In consideration of the circumstances described above, an object of the present invention is to provide a seat that reduces looseness of a seated posture in the entirety of the body.

Means for Solving the Problem

A seat relating to a first aspect of the present invention includes: a pelvis detection unit, which is provided at a seat cushion, for detecting a longitudinal direction displacement of a pelvis of a seated occupant relative to a seating surface of the seat cushion; a chest detection unit, which is provided at a seat back, for detecting a vertical direction displacement of a chest of the seated occupant relative to an occupant contact surface of the seat back; a pelvis movement unit that causes a position of the pelvis of the seated occupant to move in the longitudinal direction; a chest movement unit that causes a position of the chest of the seated occupant to move in the vertical direction; and a control unit for causing the pelvis movement unit to operate on the basis of a detection result of the pelvis detection unit and causing the position of the pelvis of the seated occupant to move in a direction to return to a position before displacement, and causing the chest movement unit to operate on the basis of a detection result of the chest detection unit and causing the position of the chest of the seated occupant to move in a direction to return to a position before displacement.

Thus, on the basis of a longitudinal direction displacement of the pelvis of the seated occupant relative to the seating surface of the seat cushion, which the pelvis detection unit provided at the seat cushion detects, the control unit causes the pelvis movement portion to operate and it moves the position of the pelvis of the seated occupant in a direction to return to the position before displacement. In addition, on the basis of a vertical direction displacement of the chest of the seated occupant relative to the occupant contact surface of the seat back, which the chest detection unit provided at the seat back detects, the control unit causes the chest movement portion to move and it moves the position of the chest of the seated occupant in a direction to return to the position before displacement. Therefore, because the position of the pelvis and the position of the chest of the seated occupant both move in directions to return to positions before displacement, looseness of the seated posture in the entirety of the body may be reduced. Herein, when returning the position of the pelvis or the position of the chest of the seated occupant to the position before displacement, the respective position is moved relative to, for example, a centre of turning of the seat back to eliminate the displacement (dislocation).

A seat relating to a second aspect of the present invention is the seat relating to the first aspect of the present invention in which the pelvis movement unit is a seating portion movement unit for moving a seating portion of the seat cushion in the longitudinal direction, and the chest movement portion is a seat back upper portion movement portion for moving an upper portion of the seat back in the vertical direction.

Thus, on the basis of a displacement of the pelvis of the seated occupant, which the pelvis detection unit provided at the seat cushion detects, the control unit causes the seating portion of the seat cushion to be moved in the longitudinal direction by the seating portion movement unit of the seat back and it moves the position of the pelvis of the seated occupant in a direction to return to the position before displacement. In addition, on the basis of a displacement of the chest of the seated occupant, which the chest detection unit provided at the seat back detects, the control unit causes the upper portion of the seat back to be moved in the vertical direction by the upper portion movement unit and it moves the position of the chest of the seated occupant in a direction to return to the position before displacement. Therefore, because the position of the pelvis and the position of the chest of the seated occupant both return toward positions before displacement, looseness of the seated posture in the entirety of the body may be reduced.

A seat relating to a third aspect of the present invention is the seat relating to the first aspect or the second aspect of the present invention, including a pelvis upper portion detection unit, which is provided at the seat back, for detecting a vertical direction displacement of an upper portion of the pelvis of the seated occupant relative to the occupant contact surface of the seat back; a pelvis upper portion support portion, which is provided at the seat back, that supports the pelvis upper portion of the seated occupant; and a pelvis upper portion support portion adjustment device that changes a position of the pelvis upper portion support portion and causes a position of the pelvis upper portion to move, wherein the control unit adjusts the position of the pelvis upper portion support portion with the pelvis upper portion support portion adjustment device on the basis of a detection result of the pelvis upper portion detection unit and causes the position of the pelvis upper portion of the seated occupant to move in a direction to return to a position before displacement.

Thus, on the basis of a detection result from the pelvis upper portion detection unit that detects a vertical direction displacement of the upper portion of the pelvis of the seated occupant relative to the occupant contact surface of the seat back, the position of the pelvis upper portion support portion, which is provided at the seat back and supports the pelvis upper portion of the seated occupant, is adjusted by the pelvis upper portion support portion adjustment device, and the position of the pelvis upper portion of the seated occupant moves in a direction to return to the position before displacement. Therefore looseness of the seated posture in the entirety of the body may be reduced.

A seat relating to a fourth aspect of the present invention is the seat relating to the third aspect of the present invention in which the control unit adjusts the position of the pelvis upper portion support portion with the pelvis upper portion support portion adjustment device on the basis of the detection result of the pelvis upper portion detection unit and causes the position of the pelvis upper portion of the seated occupant to move in the direction to return to the position before displacement after moving the position of the pelvis of the seated occupant with the pelvis movement unit and moving the position of the chest of the seated occupant with the chest movement unit.

Thus, after the position of the pelvis of the seated occupant is moved by the pelvis movement unit and the position of the chest of the seated occupant is moved by the chest movement unit, on the basis of a detection result from the pelvis upper portion detection unit, the position of the pelvis upper portion support portion is adjusted by the pelvis upper portion support portion adjustment device, and the position of the pelvis upper portion of the seated occupant moves in a direction to return to the position before displacement. Therefore, looseness of the seated posture in the entirety of the body may be reduced.

A seat relating to a fifth aspect of the present invention is the seat relating to the third aspect or the fourth aspect of the present invention in which the pelvis upper portion support portion is the seat back, and the control unit tilts the seat back rearward with the pelvis upper portion support portion adjustment device if a displacement of the pelvis upper portion of the seated occupant that is detected by the pelvis upper portion detection unit is a displacement upward, and tilts the seat back forward with the pelvis upper portion support portion adjustment device if a displacement of the pelvis upper portion of the seated occupant that is detected by the pelvis upper portion detection unit is a displacement downward.

Thus, when the position of the pelvis upper portion of the seated occupant detected by the pelvis upper portion detection unit is displaced upward, the control unit tilts the seat back rearward with the pelvis upper portion support portion adjustment device. In addition, when the position of the pelvis upper portion of the seated occupant detected by the pelvis upper portion detection unit is displaced downward, the control unit tilts the seat back forward with the pelvis upper portion support portion adjustment device. Therefore, the position of the pelvis upper portion of the seated occupant may be returned to the position before displacement by reclining the seat back in the longitudinal direction. Therefore, looseness of the seated posture in the entirety of the body may be reduced.

A seat relating to a sixth aspect of the present invention is the seat relating to the third aspect or the fourth aspect of the present invention in which the pelvis upper portion support portion is a spring that is disposed at the seat back and supports the pelvis upper portion, and the control unit moves the spring upward in the seat back with the pelvis upper portion support portion adjustment device if a displacement of the pelvis upper portion of the seated occupant that is detected by the pelvis upper portion detection unit is a displacement to upward, and moves the spring downward in the seat back with the pelvis upper portion support portion adjustment device if a displacement of the pelvis upper portion of the seated occupant that is detected by the pelvis upper portion detection unit is a displacement to downward.

Thus, when the position of the pelvis upper portion of the seated occupant detected by the pelvis upper portion detection unit is displaced upward, the control unit moves the spring that is provided in the seat back and that supports the pelvis upper portion upward with the pelvis upper portion support portion adjustment device. In addition, when the position of the pelvis upper portion of the seated occupant detected by the pelvis upper portion detection unit is displaced downward, the control unit moves the spring downward with the pelvis upper portion support portion adjustment device. Therefore, the angle of the pelvis is continuously maintained by the spring abutting against and supporting the pelvis upper portion, and looseness of the seated posture may be reduced. Therefore, looseness of the seated posture in the entirety of the body may be reduced.

Effect of the Invention

According to the present invention, looseness of the seated posture in the entirety of the body may be reduced.

DETAILED DESCRIPTION OF THE INVENTION

A first exemplary embodiment of a seat of the present invention is described in accordance with FIG. 1 to FIG. 4. Herein, an arrow FR that is shown where suitable in these drawings indicates a vehicle forward side, and an arrow UP indicates a vehicle upward side.

Figure 1:
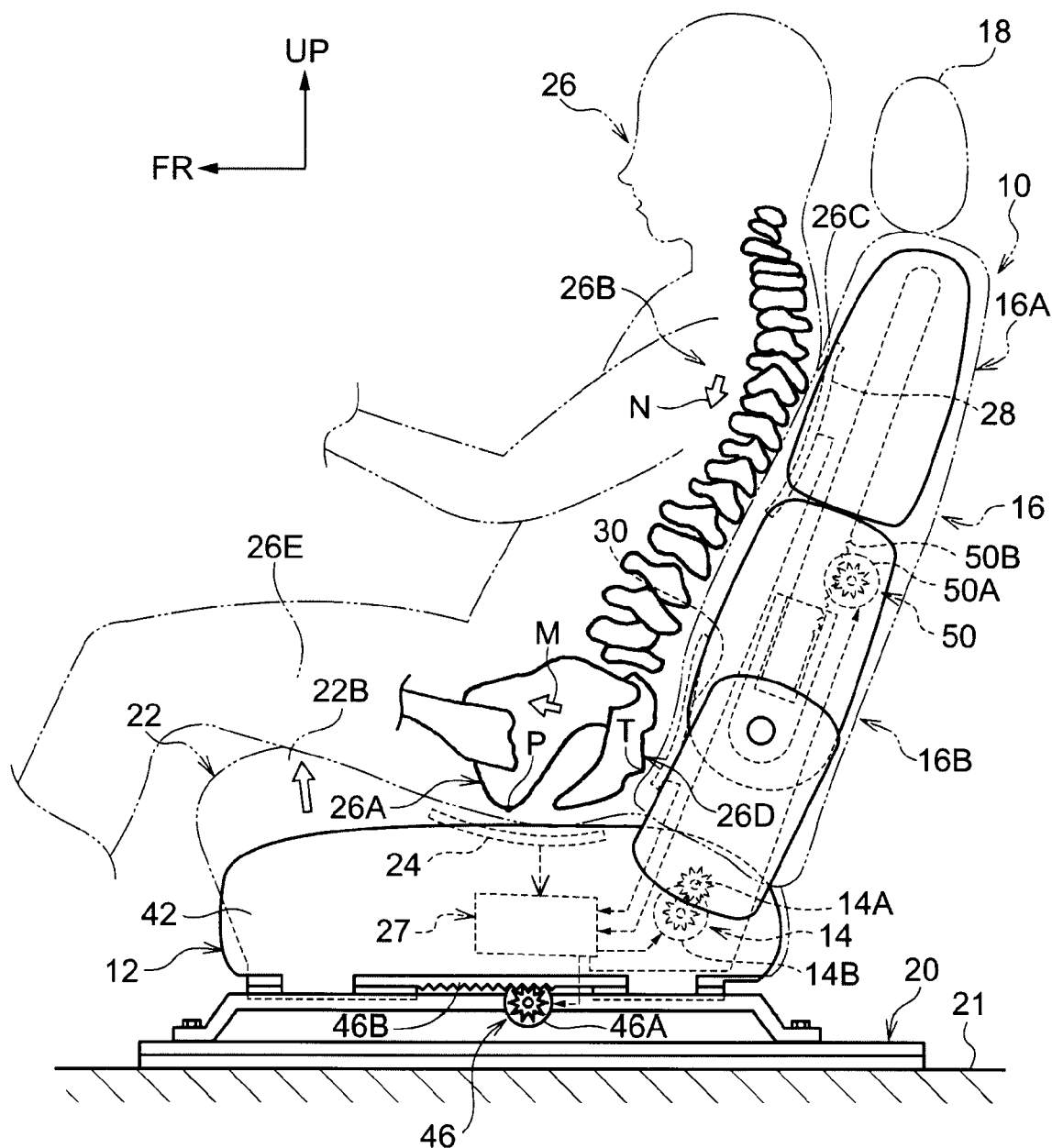
FIG. 1 is a schematic side view illustrating principal portions of a seat relating to a first exemplary embodiment of the present invention.
Figure 2:
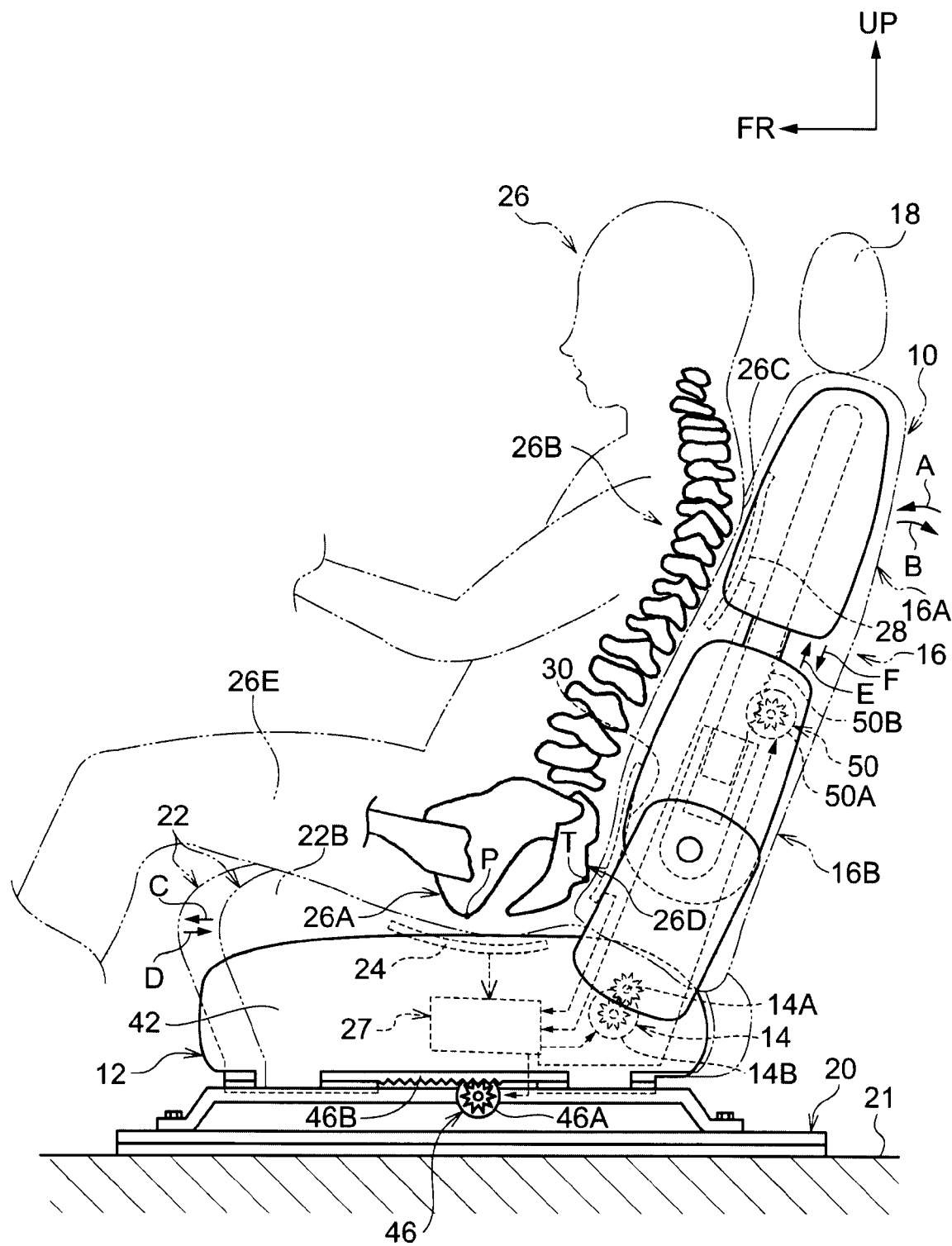
FIG. 2 is a schematic side view illustrating movements of the principal portions of the seat relating to the first exemplary embodiment of the present invention.
Figure 3:
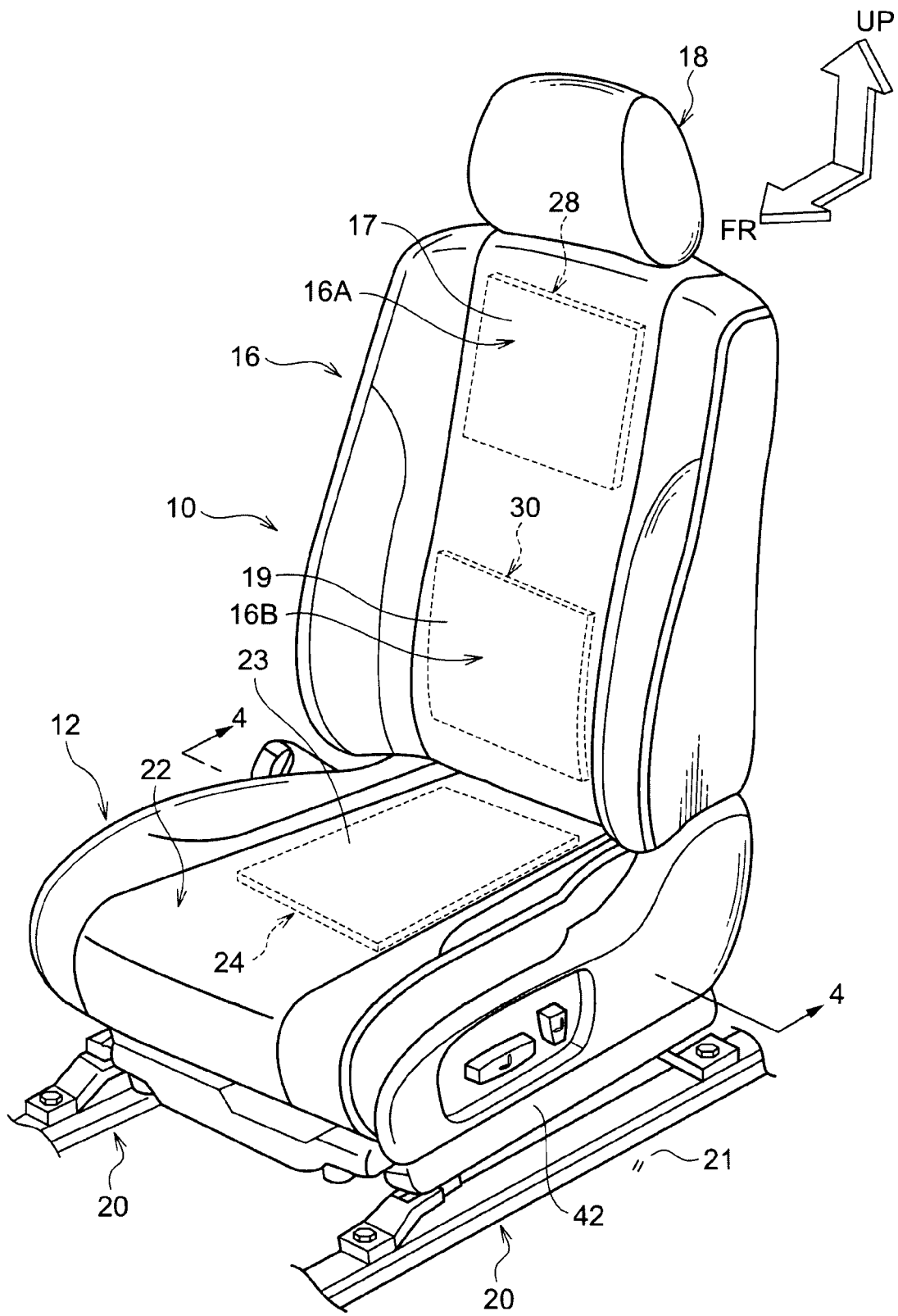
FIG. 3 is a perspective view, seen from obliquely forward, illustrating the seat relating to the first exemplary embodiment of the present invention.

In FIG. 1, principal portions of the seat relating to the present exemplary embodiment are illustrated by a schematic side view, and in FIG. 2, a state in which the principal portions of the seat relating to the present exemplary embodiment have moved is illustrated by a schematic side view. In FIG. 3, the seat relating to the present exemplary embodiment is illustrated by a perspective view, and in FIG. 4, an enlarged sectional view cut along section line 4-4 of FIG. 3 is illustrated.

As illustrated in FIG. 3, a vehicle seat 10, which serves as the seat of the present exemplary embodiment, is structured to include a seat cushion 12 on which an occupant sits, a seat back 16 that is disposed at a rear end portion side of the seat cushion 12 and can be inclined in the longitudinal direction by a reclining mechanism 14 (see FIG. 1), and a head rest 18 that is provided at an upper end portion of the seat back 16 to be vertically adjustable and supports the head of the occupant.

Herein, the vehicle seat 10 is mounted to a vehicle cabin floor portion 21 via a seat track (seat adjuster) 20. Therefore, the vehicle seat 10 is movable in the vehicle longitudinal direction.

As illustrated in FIG. 1, a reclining turning axis 14A of the reclining mechanism 14 of the vehicle seat 10 is disposed with a seat lateral direction (a direction orthogonal to the surface of the paper of FIG. 1) being the axial direction. At a time of reclining, by turning of a motor 14B that constitutes the reclining mechanism 14, the seat back 16 turns to forward in the vehicle (the direction of arrow A in FIG. 2) or rearward in the vehicle (the direction of arrow B in FIG. 2) with the reclining turning axis 14A as the axis of turning.

As illustrated in FIG. 3, a pelvis detection sensor 24 is disposed inside a seating portion 22 that constitutes a seat cushion seating surface of the seat cushion 12 on which the occupant sits. The pelvis detection sensor 24 serves as a pelvis detection unit for detecting displacement of a pelvis 26A of a seated occupant 26 (see FIG. 1). This pelvis detection sensor 24 is constituted by a sheet-form pressure sensor.

As illustrated in FIG. 1, the pelvis detection sensor 24 detects loads acting on the seating portion 22 of the seat cushion 12 from the pelvis 26A of the seated occupant 26 sitting on the vehicle seat 10, and may detect a peak position thereof. The pelvis detection sensor 24 is electrically connected to a control device 27 that serves as a control unit. The control device 27 is provided in the seat cushion 12.

As illustrated in FIG. 3, a chest detection sensor 28 is disposed inside an upper portion 16A of the seat back 16, which constitutes a seat back occupant contact surface 17 at the upward side of the seat back 16. The chest detection sensor 28 serves as a chest detection unit for detecting displacement of a chest 26B of the seated occupant 26 (see FIG. 1). Herein, the term chest includes the skeleton of the chest, which is formed as a cage by the thoracic vertebrae, the ribs and the sternum.

As illustrated in FIG. 1, the chest detection sensor 28 may detect a load acting on the upper portion 16A of the seat back 16 from the chest 26B of the seated occupant 26 sitting on the vehicle seat 10. More specifically, it may detect a position 26C of one or more of the left and right shoulder blades of the seated occupant 26. Herein, another position may be detected instead of the shoulder blade position 26C. The chest detection sensor 28 is electrically connected to the control device 27.

As illustrated in FIG. 3, a pelvis upper portion detection sensor 30 is disposed inside a lower portion 16B of the seat back 16, which constitutes a seat back occupant contact surface 19 at the downward side of the seat back 16. The pelvis upper portion detection sensor 30 serves as a pelvis upper portion detection unit for detecting displacement of a pelvis upper portion 26D of the seated occupant 26 (see FIG. 1). This pelvis upper portion detection sensor 30 is constituted by a sheet-form pressure sensor.

As illustrated in FIG. 1, the pelvis upper portion detection sensor 30 detects a load acting on the lower portion 16B of the seat back 16 from the pelvis upper portion 26D of the seated occupant 26 sitting on the vehicle seat 10, and may detect a peak position thereof. The pelvis upper portion detection sensor 30 is electrically connected to the control device 27.

Figure 4:
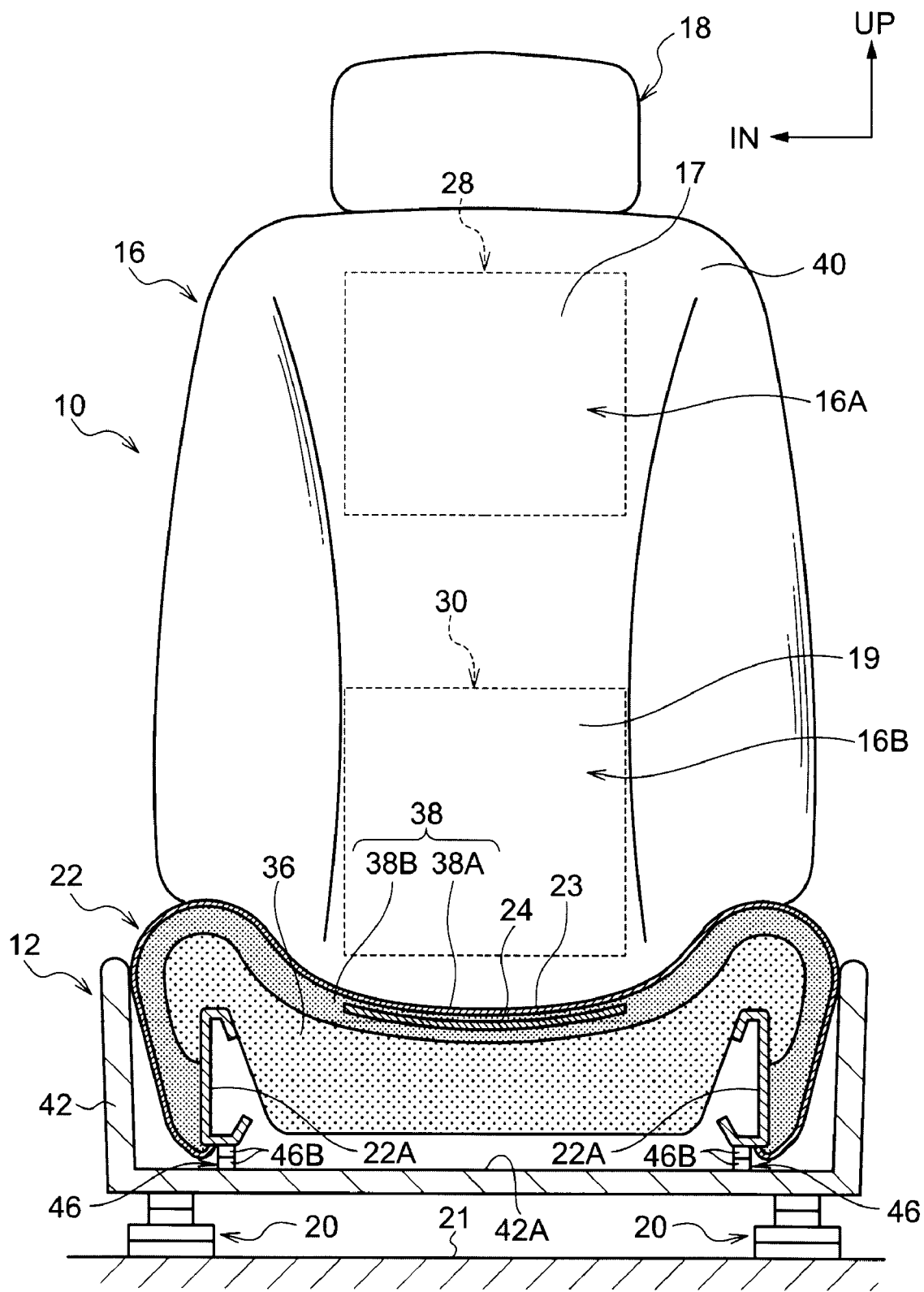
FIG. 4 is an enlarged sectional view cut along section line 4-4 of FIG. 3.

As illustrated in FIG. 4, the pelvis detection sensor 24 is incorporated in a seat cover 38 that covers a seat pad 36 of the seating portion 22 of the seat cushion 12. Describing it more specifically, the seat cover 38 has a two layer structure, of a first layer 38A that is structured of leather or the like and structures a design surface, and a second layer 38B that is structured of a foam material or the like. The pelvis detection sensor 24 is incorporated in the second layer 38B. Herein, the pelvis detection sensor 24 may be disposed by being stuck onto an upper face of the second layer 38B or the like.

Although not illustrated in the drawings, the chest detection sensor 28 and the pelvis upper portion detection sensor 30 are similarly disposed in a seat skin 40 of the seat back 16.

As illustrated in FIG. 1, the seating portion 22 of the seat cushion 12 is coupled to a seat cushion frame 42 via a seating portion movement device 46, which serves as a pelvis movement unit. A motor 46A that structures a portion of the seating portion movement device 46 is electrically connected to the control device 27.

As illustrated in FIG. 4, left and right guide rails 46B, which structure portions of the seating portion movement device 46, are provided along the vehicle longitudinal direction between a floor portion 42A of the seat cushion frame 42 and left and right frames 22A of the seating portion 22.

Thus, the seating portion 22 is made relatively movable forward in the vehicle (in the direction of arrow C in FIG. 2) or rearward in the vehicle (in the direction of arrow D in FIG. 2) along the guide rails 46B relative to the seat cushion frame 42 and the seat back 16 provided at the rear end portion of the seat cushion frame 42, by the motor 46A of the seating portion movement device 46 turning in predetermined directions on the basis of output signals from the control device 27.

As illustrated in FIG. 1 an upper portion movement device 50 is provided inside the seat back 16. The upper portion movement device 50 serves as a seat back upper portion movement unit for moving the upper portion 16A of the seat back 16 in the vertical direction. A motor 50A that structures a portion of the upper portion movement device 50 is electrically connected to the control device 27. Left and right guide arms 50B that structure portions of the upper portion movement device 50 extend toward the lower portion 16B from the upper portion 16A of the seat back 16. By turning of the motor 50A, the left and right guide arms 50B move upward in the seat (in the direction of arrow E in FIG. 2) or downward in the seat (in the direction of arrow F in FIG. 2).

Thus, the upper portion 16A of the seat back 16 to which the guide arms 50B are attached is made relatively movable upward in the seat (the direction of arrow E in FIG. 2) or downward in the seat (the direction of arrow F in FIG. 2) relative to the lower portion 16B, by the motor 50A turning in predetermined directions on the basis of output signals from the control device 27.

Further, in the present exemplary embodiment, the seat back 16 serves as a pelvis upper portion support portion and the reclining mechanism 14 serves as a pelvis upper portion support portion adjustment device.

Herein, as illustrated in FIG. 1, a thigh portion 26E of the seated occupant 26 is supported from below by a front portion 22B of the seating portion 22. Therefore, the seated occupant 26 is supported at four locations—the portion of the seating portion 22 at which the pelvis detection sensor 24 is disposed and the front portion 22B thereof, and a portion of the seat back 16 at which the chest detection sensor 28 is disposed and a portion thereof at which the pelvis upper portion detection sensor 30 is disposed.

Next, operations and effects of the above exemplary embodiment are described.

In the present exemplary embodiment, when the seated occupant 26 is seated on the vehicle seat 10, from a load distribution of the pelvis 26A of the seated occupant 26 that the pelvis detection sensor 24 provided at the seating portion 22 of the seat cushion 12 of the vehicle seat 10 detects, the control device 27 detects and memorizes an initial peak position of a load peak position P. In addition, from a load distribution of the chest 26B of the seated occupant 26 that the chest detection sensor 28 provided at the upper portion of the seat back 16 of the vehicle seat 10 detects, the control device 27 detects the position 26C of one or both of the left and right shoulder blades C and memorizes the same as an initial position. Herein, the load peak position P of the pelvis 26A is a position of a hipbone joint.

Furthermore, in the present exemplary embodiment, when the seated occupant 26 is seated on the vehicle seat 10, from a load distribution of the pelvis upper portion 26D of the seated occupant 26 that the pelvis upper portion detection sensor 30 provided at the lower portion of the seat back 16 of the vehicle seat 10 detects, the control device 27 detects and memorizes an initial position of a load peak position T.

Furthermore, when the seated occupant 26 is seated on the vehicle seat 10 for a long period, generally, the pelvis 26A dislocates forward in the vehicle (the direction of arrow M in FIG. 1) and the chest 26B dislocates downward in the vehicle (the direction of arrow N in FIG. 1) with curving of the spine.

Accordingly, at a predetermined timing, for example, after each passage of a predetermined period, from the load distribution of the pelvis 26A of the seated occupant 26 that the pelvis detection sensor 24 provided at the seating portion 22 of the seat cushion 12 of the vehicle seat 10 detects, the control device 27 detects a peak position after displacement of the load peak position P and compares it with the initial peak position detected in advance.

Then, if a dislocation between the initial peak position and the peak position after displacement of the load peak position P of the pelvis 26A of the seated occupant 26 is greater than a predetermined value, the control device 27 causes the seating portion 22 of the seat cushion 12 to move forward in the vehicle or rearward in the vehicle to eliminate this dislocation.

Specifically, it moves the seating portion 22 of the seat cushion 12 forward in the vehicle (the direction of arrow C in FIG. 2) or rearward in the vehicle (the direction of arrow D in FIG. 2) relative to the seat cushion frame 42, along the guide rails 46B of the seating portion movement device 46 between a forward position shown by two-dot chain lines in FIG. 2 and a rear position shown by three-dot chain lines, by turning the motor 46A of the seating portion movement device 46 in a predetermined direction with output signals from the control device 27, and eliminates the dislocation between the initial peak position and the peak position after displacement of the load peak position P.

For example, if the peak position after displacement of the load peak position P has moved forward in the vehicle relative to the initial peak position, the seating portion 22 of the seat cushion 12 moves rearward in the vehicle (the direction of arrow D in FIG. 2).

Next, from the load distribution of the chest 26B of the seated occupant 26 that the chest detection sensor 28 provided at the upper portion of the seat back 16 of the vehicle seat 10 detects, the control device 27 detects a position after displacement of the shoulder blade position 26C and compares it with the initial position detected in advance.

Then, if a dislocation between the initial position and the peak position after displacement of the shoulder blade position 26C of the seated occupant 26 is greater than a predetermined value, the control device 27 causes the upper portion 16A of the seat back 16 to move upward in the vehicle or downward in the vehicle to eliminate this dislocation.

Specifically, it moves the upper portion 16A of the seat back 16 upward in the vehicle (the direction of arrow E in FIG. 2) or downward in the vehicle (the direction of arrow F in FIG. 2) relative to the lower portion 16B, via the guide arms 50B of the upper portion movement device 50 between a downward position shown in FIG. 1 and an upward position shown in FIG. 2, by turning the motor 50A of the upper portion movement device 50 in a predetermined direction with output signals from the control device 27, and eliminates the dislocation between the initial position and the position after displacement of the shoulder blade position 26C.

For example, if the position after displacement of the shoulder blade position 26C has moved downward relative to the initial position, the upper portion 16A of the seat back 16 moves upward in the vehicle relative to the lower portion 16B (the direction of arrow E in FIG. 2).

As a result, both the position of the pelvis 26A of the seated occupant 26 and the position 26C of one or more of the left and right shoulder blades, which serves as a position of the chest 26B, return to positions before displacement (initial positions). Thus, looseness of the seated posture of the seated occupant 26 in the entirety of the body may be reduced. Therefore, even in driving over long periods, if the posture of the seated occupant 26 is formed with the backbone in an S-curve, which is the ideal shape, in an initial state of sitting on the vehicle seat 10, for example, a seated initial state, this posture may be maintained, and tiredness, back pain and the like that are produced by the posture being loose may be suppressed.

Moreover, in the present exemplary embodiment, after the seating portion movement device 46 and the upper portion movement device 50 are operated, from the load distribution of the pelvis upper portion 26D of the seated occupant 26 that the pelvis upper portion detection sensor 30 provided at the lower portion of the seat back 16 of the vehicle seat 10 detects, the control device 27 detects a peak position after displacement of the load peak position T, and compares it with the initial peak position detected in advance.

Then, if a dislocation between the initial peak position and the peak position after displacement of the load distribution of the pelvis upper portion 26D of the seated occupant 26 is greater than a predetermined value, the control device 27 causes the seat back 16 to tilt forward in the vehicle (in the direction of arrow A in FIG. 2) or rearward in the vehicle (in the direction of arrow B in FIG. 2) to eliminate this dislocation.

Specifically, it causes the seat back 16 to tilt forward in the vehicle (the direction of arrow A in FIG. 2) or rearward in the vehicle (the direction of arrow B in FIG. 2) with the reclining turning axis 14A as the turning axis, by turning the motor 14B of the reclining mechanism 14 in a predetermined direction with output signals from the control device 27.

For example, if the displacement of the pelvis upper portion 26D of the seated occupant 26 is a displacement to upward, the seat back 16 tilts to rearward in the vehicle (the direction of arrow B in FIG. 2). Further, if the displacement of the pelvis upper portion 26D of the seated occupant 26 is a displacement to downward, the seat back 16 tilts to forward in the vehicle (the direction of arrow A in FIG. 2). As a result, looseness of the seated posture of the seated occupant 26 in the entirety of the body may be reduced.

Herein, if a positional dislocation of the pelvis upper portion 26D of the seated occupant 26 is returned by adjustment of the tilt angle of the seat back 16, the position of the chest 26B of the seated occupant 26 is displaced a little by the movement of the seat back 16. In order to suppress this displacement, a structure is possible that employs an articulated mechanism in which a vertical direction middle portion of the seat back 16 is tiltable in the vehicle longitudinal direction and, by adjustment of this articulated mechanism, prevents re-dislocation in association with correction of a dislocation amount of the pelvis upper portion 26D.

Figure 5:
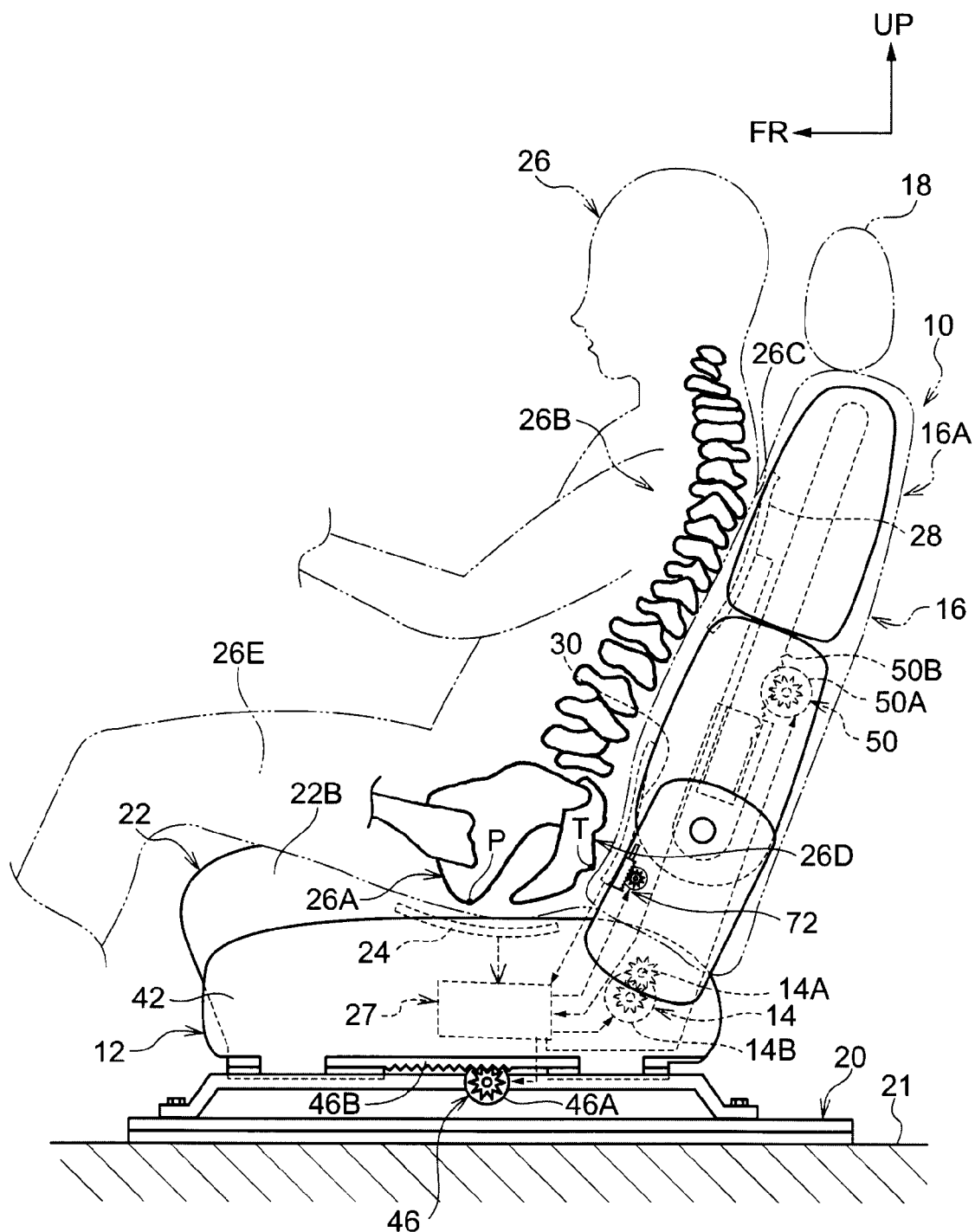
FIG. 5 is a schematic side view illustrating principal portions of a seat relating to a second exemplary embodiment of the present invention.
Figure 6:
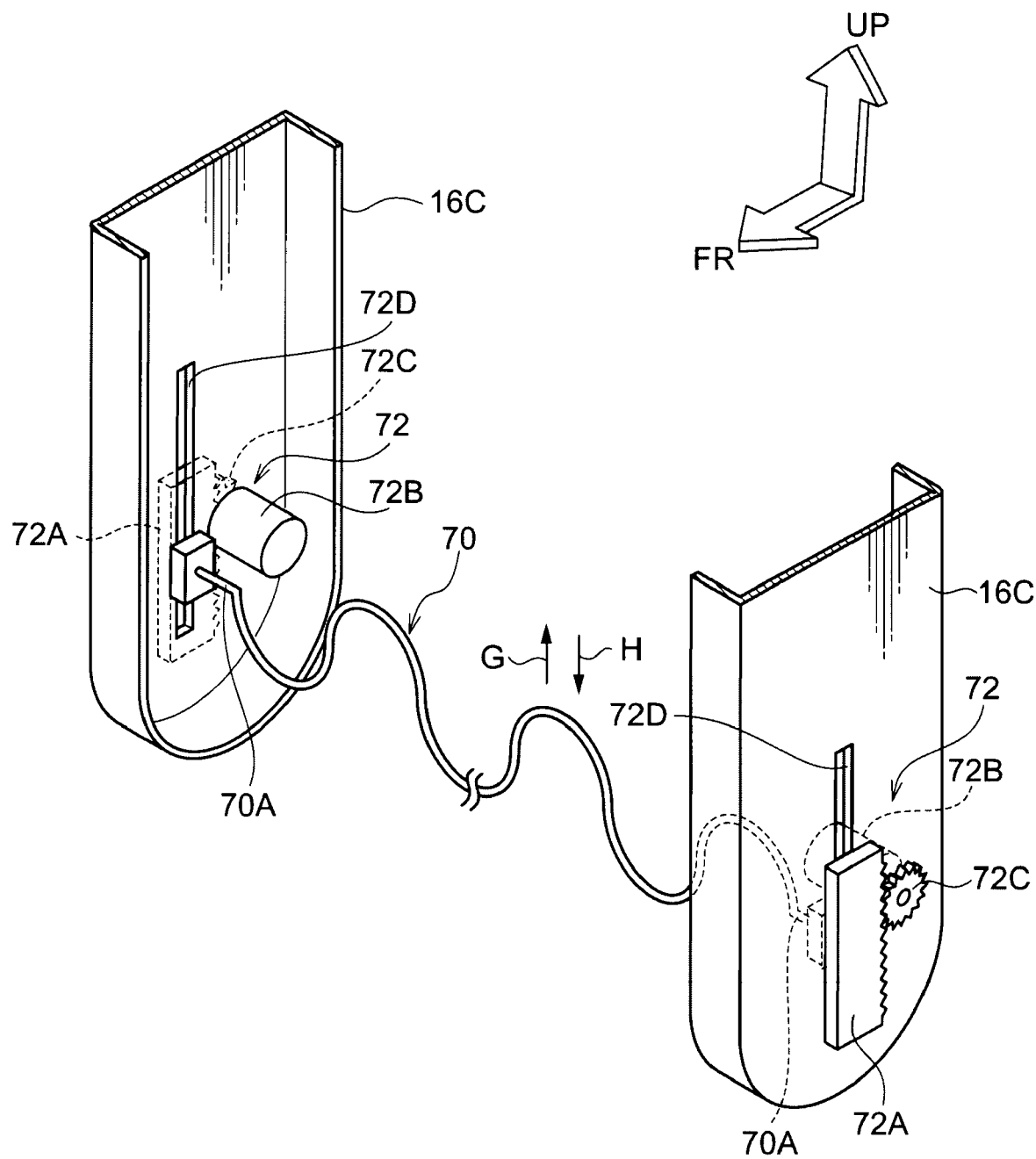
FIG. 6 is a perspective view, seen from obliquely forward, illustrating a portion of the seat relating to the second exemplary embodiment of the present invention.

Next, a second exemplary embodiment of the seat of the present invention is described in accordance with FIG. 5 and FIG. 6. Herein, members the same as in the first exemplary embodiment are assigned the same reference numerals and are not described.

In FIG. 5, principal portions of the seat relating to the present exemplary embodiment are illustrated by a schematic side view, and in FIG. 6, a portion of the seat relating to the present exemplary embodiment is illustrated by a perspective view.

As illustrated in FIG. 5 and FIG. 6, in the present exemplary embodiment, an S-spring 70, which serves as the pelvis upper portion support portion, is disposed at a region of a lower portion of the seat back 16 of the vehicle seat 10 that supports the pelvis upper portion 26D of the seated occupant 26 from rearward in the vehicle. Each of two end portions 70A of the S-spring 70 are fixed to moving bodies 72A of a spring-moving device 72, which serves as the pelvis upper portion support portion adjustment device. The moving bodies 72A are coupled to motors 72B via gears 72C. The motors 72B are electrically connected to the control device 27 (see FIG. 5). By the control device 27 turning the motors 72B in predetermined directions, the moving bodies 72A move upward in the vehicle (in the direction of arrow G in FIG. 6) or downward in the vehicle (in the direction of arrow H in FIG. 6) along guide holes 72D that are formed in seat back frames 16C.

Thus, in the present exemplary embodiment, similarly to the first exemplary embodiment, after the seating portion movement device 46 and the upper portion movement device 50 are operated, if a dislocation between the initial peak position and the peak position after displacement of the load distribution of the pelvis upper portion 26D of the seated occupant 26 is greater than a predetermined value, the control device 27 causes the S-spring 70 to move upward in the vehicle (the direction of arrow G in FIG. 6) or downward in the vehicle (the direction of arrow H in FIG. 6) to eliminate this dislocation.

Specifically, it causes the S-spring 70 to move upward in the vehicle (the direction of arrow G in FIG. 6) or downward in the vehicle (the direction of arrow H in FIG. 6) by moving the moving bodies 72A along the guide holes 72D, by turning the motors 72B of the spring-moving device 72 in predetermined directions with output signals from the control device 27.

For example, if the displacement of the pelvis upper portion 26D of the seated occupant 26 is a displacement to upward, the S-spring 70 moves to upward in the vehicle (the direction of arrow G in FIG. 6) and the pelvis upper portion 26D is supported by the S-spring 70. Further, if the displacement of the pelvis upper portion 26D of the seated occupant 26 is a displacement to downward, the S-spring 70 moves to downward in the vehicle (the direction of arrow H in FIG. 6) and the pelvis upper portion 26D is supported by the S-spring 70. As a result, looseness of the seated posture of the seated occupant 26 in the entirety of the body may be reduced.

In the above, detailed descriptions of particular embodiments of the present invention have been described, but the present invention is not to be limited by the above exemplary embodiments and it will be apparent to practitioners skilled in the art that numerous other embodiments are possible within the technical scope of the present invention. For example, although the seat back 16 or the S-spring 70 serving as the pelvis upper portion support portion is operated by the control device 27 after the seating portion movement device 46 and the upper portion movement device 50 are operated, looseness of the seated posture of the seated occupant 26 in the entirety of the body may be reduced by the seating portion movement device 46, the upper portion movement device 50 and the pelvis upper portion support portion (the seat back 16 or the S-spring 70) being operated by the control device 27 simultaneously or in a predetermined order.

Further, in the above exemplary embodiments, the seat cover has a two-layer structure, but a structure in which the seat cover has a single-layer structure, and each sensor of the pelvis detection sensor and the like is disposed between the seat cover and a seat pad, and other structures, in which the seat cover has a three-layer structure or the like, are possible.

Further, in the above exemplary embodiments the seat of the present invention is applied to a vehicle seat, but the seat of the present invention is also applicable to seats other than for vehicles.

The invention claimed is:

1. A seat comprising:
   a pelvis detection unit, which is provided at a seat cushion, for detecting a longitudinal direction displacement of a pelvis of a seated occupant relative to a seating surface of the seat cushion;
   a chest detection unit, which is provided at a seat back, for detecting a vertical direction displacement of a chest of the seated occupant relative to an occupant contact surface of the seat back;
   a pelvis movement unit that causes a position of the pelvis of the seated occupant to move in the longitudinal direction;
   a chest movement unit that causes a position of the chest of the seated occupant to move in the vertical direction; and
   a control unit for
      causing the pelvis movement unit to operate on the basis of a detection result of the pelvis detection unit and causing the position of the pelvis of the seated occupant to move in a direction to return to a position before displacement, and
      causing the chest movement unit to operate on the basis of a detection result of the chest detection unit and causing the position of the chest of the seated occupant to move in a direction to return to a position before displacement.

2. The seat according to claim 1, further comprising:
   a pelvis upper portion detection unit, which is provided at the seat back, for detecting a vertical direction displacement of an upper portion of the pelvis of the seated occupant relative to the occupant contact surface of the seat back;
   a pelvis upper portion support portion, which is provided at the seat back, that supports the pelvis upper portion of the seated occupant; and
   a pelvis upper portion support portion adjustment device that changes a position of the pelvis upper portion support portion and causes a position of the pelvis upper portion to move,
   wherein the control unit adjusts the position of the pelvis upper portion support portion with the pelvis upper portion support portion adjustment device on the basis of a detection result of the pelvis upper portion detection unit and causes the position of the pelvis upper portion of the seated occupant to move in a direction to return to a position before displacement.

3. The seat according to claim 2, wherein the pelvis upper portion support portion is the seat back, and the control unit tilts the seat back rearward with the pelvis upper portion support portion adjustment device if a displacement of the pelvis upper portion of the seated occupant that is detected by the pelvis upper portion detection unit is a displacement upward, and tilts the seat back forward with the pelvis upper portion support portion adjustment device if a displacement of the pelvis upper portion of the seated occupant that is detected by the pelvis upper portion detection unit is a displacement downward.

4. The seat according to claim 2, wherein the pelvis upper portion support portion is a spring that is disposed at the seat back and supports the pelvis upper portion, and the control unit moves the spring upward in the seat back with the pelvis upper portion support portion adjustment device if a displacement of the pelvis upper portion of the seated occupant that is detected by the pelvis upper portion detection unit is a displacement upward, and moves the spring downward in the seat back with the pelvis upper portion support portion adjustment device if a displacement of the pelvis upper portion of the seated occupant that is detected by the pelvis upper portion detection unit is a displacement downward.

5. The seat according to claim 2, wherein the control unit adjusts the position of the pelvis upper portion support portion with the pelvis upper portion support portion adjustment device on the basis of the detection result of the pelvis upper portion detection unit and causes the position of the pelvis upper portion of the seated occupant to move in the direction to return to the position before displacement after moving the position of the pelvis of the seated occupant with the pelvis movement unit and moving the position of the chest of the seated occupant with the chest movement unit.

6. The seat according to claim 5, wherein the pelvis upper portion support portion is the seat back, and the control unit tilts the seat back rearward with the pelvis upper portion support portion adjustment device if a displacement of the pelvis upper portion of the seated occupant that is detected by the pelvis upper portion detection unit is a displacement upward, and tilts the seat back forward with the pelvis upper portion support portion adjustment device if a displacement of the pelvis upper portion of the seated occupant that is detected by the pelvis upper portion detection unit is a displacement downward.

7. The seat according to claim 5, wherein the pelvis upper portion support portion is a spring that is disposed at the seat back and supports the pelvis upper portion, and the control unit moves the spring upward in the seat back with the pelvis upper portion support portion adjustment device if a displacement of the pelvis upper portion of the seated occupant that is detected by the pelvis upper portion detection unit is a displacement upward, and moves the spring downward in the seat back with the pelvis upper portion support portion adjustment device if a displacement of the pelvis upper portion of the seated occupant that is detected by the pelvis upper portion detection unit is a displacement downward.

8. The seat according to claim 1, wherein the pelvis movement unit is a seating portion movement unit for moving a seating portion of the seat cushion in the longitudinal direction, and the chest movement unit is a seat back upper portion movement unit for moving an upper portion of the seat back in the vertical direction.

9. The seat according to claim 8, further comprising:
a pelvis upper portion detection unit, which is provided at the seat back, for detecting a vertical direction displacement of an upper portion of the pelvis of the seated occupant relative to the occupant contact surface of the seat back;
a pelvis upper portion support portion, which is provided at the seat back, that supports the pelvis upper portion of the seated occupant; and
a pelvis upper portion support portion adjustment device that changes a position of the pelvis upper portion support portion and causes a position of the pelvis upper portion to move,
wherein the control unit adjusts the position of the pelvis upper portion support portion with the pelvis upper portion support portion adjustment device on the basis of a detection result of the pelvis upper portion detection unit and causes the position of the pelvis upper portion of the seated occupant to move in a direction to return to a position before displacement.

10. The seat according to claim 9, wherein the pelvis upper portion support portion is the seat back, and the control unit tilts the seat back rearward with the pelvis upper portion support portion adjustment device if a displacement of the pelvis upper portion of the seated occupant that is detected by the pelvis upper portion detection unit is a displacement upward, and tilts the seat back forward with the pelvis upper portion support portion adjustment device if a displacement of the pelvis upper portion of the seated occupant that is detected by the pelvis upper portion detection unit is a displacement downward.

11. The seat according to claim 9, wherein the pelvis upper portion support portion is a spring that is disposed at the seat back and supports the pelvis upper portion, and the control unit moves the spring upward in the seat back with the pelvis upper portion support portion adjustment device if a displacement of the pelvis upper portion of the seated occupant that is detected by the pelvis upper portion detection unit is a displacement upward, and moves the spring downward in the seat back with the pelvis upper portion support portion adjustment device if a displacement of the pelvis upper portion of the seated occupant that is detected by the pelvis upper portion detection unit is a displacement downward.

12. The seat according to claim 9, wherein the control unit adjusts the position of the pelvis upper portion support portion with the pelvis upper portion support portion adjustment device on the basis of the detection result of the pelvis upper portion detection unit and causes the position of the pelvis upper portion of the seated occupant to move in the direction to return to the position before displacement after moving the position of the pelvis of the seated occupant with the pelvis movement unit and moving the position of the chest of the seated occupant with the chest movement unit.

13. The seat according to claim 12, wherein the pelvis upper portion support portion is the seat back, and the control unit tilts the seat back rearward with the pelvis upper portion support portion adjustment device if a displacement of the pelvis upper portion of the seated occupant that is detected by the pelvis upper portion detection unit is a displacement upward, and tilts the seat back forward with the pelvis upper portion support portion adjustment device if a displacement of the pelvis upper portion of the seated occupant that is detected by the pelvis upper portion detection unit is a displacement downward.

14. The seat according to claim 12, wherein the pelvis upper portion support portion is a spring that is disposed at the seat back and supports the pelvis upper portion, and the control unit moves the spring upward in the seat back with the pelvis upper portion support portion adjustment device if a displacement of the pelvis upper portion of the seated occupant that is detected by the pelvis upper portion detection unit is a displacement upward, and moves the spring downward in the seat back with the pelvis upper portion support portion adjustment device if a displacement of the pelvis upper portion of the seated occupant that is detected by the pelvis upper portion detection unit is a displacement downward.

* * * * *